Sept. 8, 1942.                    C. THUMIM                    2,295,308
                        HIGH SPEED RECLOSING MECHANISM
                             Filed Feb. 26, 1938
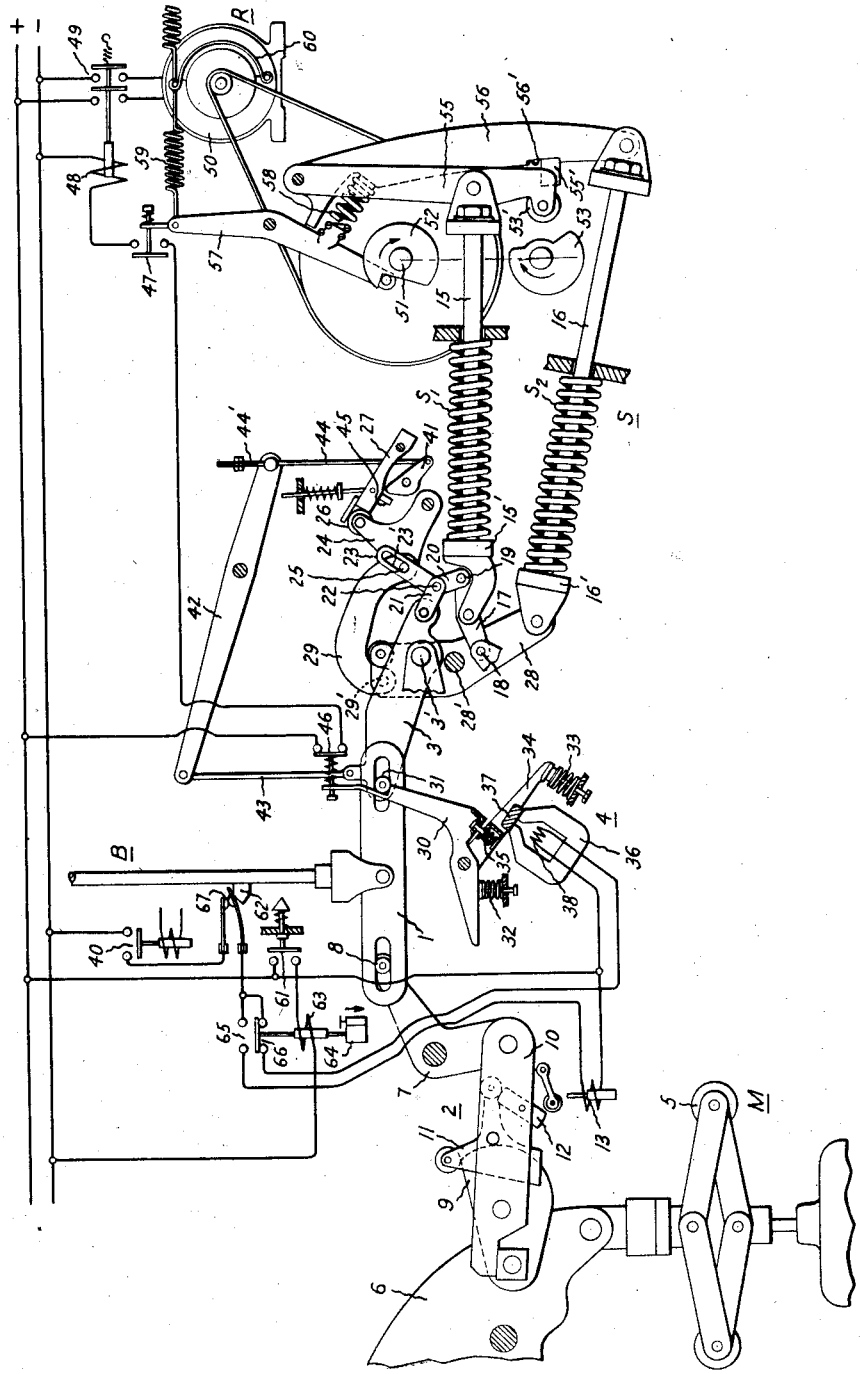
Inventor:
Carl Thumim,
by Harry E. Dunham
His Attorney.

Patented Sept. 8, 1942

2,295,308

UNITED STATES PATENT OFFICE 2,295,308

HIGH SPEED RECLOSING MECHANISM

Carl Thumim, Lansdowne, Pa., assignor to General Electric Company, a corporation of New York Application February 26, 1938, Serial No. 192,782

30 Claims. (Cl. 175—294)

My invention relates to high speed reclosing mechanisms, more particularly as applied to electric circuit breakers which are connected in high voltage networks or power transmission lines, and has for its principal object the provision of an improved high speed reclosing mechanism that is efficient, positive and very rapid in operation, and that is effective to apply the reclosing force instantly at a predetermined point in the opening stroke.

In electric distribution systems where continuity of service is a very important factor, means have been provided for quickly reclosing an electric circuit breaker one or more times after automatic opening in response to a fault condition on the assumption that a very large percentage of faults, such as surges due to lightning, for example, are of a temporary nature. From the standpoint of service continuity, the ideal condition is that the breaker be reclosed instantly after the breaker has cleared the fault. Accordingly, where standard opening and closing mechanisms are employed, reclosure does not actually start until the full opening stroke has been completed.

The function of a circuit breaker is not only to open a circuit and clear faults, but also to maintain the circuit clear under adverse voltage conditions. That is, the length of stroke of the circuit breaker must be sufficient to prevent re-striking of the arc in case the line voltage is several times that of normal. As contrasted with this isolating function of the breaker, it should be borne in mind that a well designed breaker can actually clear a fault within a few inches of opening stroke.

There is disclosed in my application, Serial No. 85,789, filed June 17, 1936, for high speed reclosing mechanisms, a reclosing mechanism wherein a pair of separately energized motor mechanisms are interrelated for the purpose of obtaining rapid reclosure.

In accordance with the present invention the opening operation is carried only to a predetermined point at which the fault is usually cleared and stored power devices, such as charged springs, for example, are applied instantly at that point to initiate the reclosing operation.

My invention will be more fully set forth in the following description referring to the accompanying drawing, and the features of novelty which characterize my invention will be pointed out with particularity in the claims annexed to and forming a part of this specification.

Referring to the drawing the single figure thereof is a partly diagrammatic layout of a high speed reclosing mechanism embodying the present invention.

The mechanism as shown comprises essentially a circuit breaker operating member or rod B, the breaker (not shown) being in the closed circuit position, a suitable motor mechanism M shown as of the centrifugal type, and an auxiliary power device, such as a spring mechanism S for automatic opening and reclosing of the breaker. The motor mechanism M can be operated in the usual manner from a remotely positioned control panel for normal opening and closing operations of the breaker. A spring recharging and resetting mechanism is generally indicated at R.

Before proceeding with a detail description of the mechanism the coaction and interrelation of the main elements of the mechanism above referred to will be described generally. The breaker rod B is pivotally connected to a floating lever 1 that is in turn operatively connected at one end through a collapsible thrust-transmitting linkage 2 to the motor device M, and at the other end to the spring mechanism S through a lever 3. The lever 3 having a fixed pivot at 3' is adapted to be latched in the position shown by a high speed trip device 4.

The arrangement is such that with the breaker closed as indicated, the linkage 2 holds stationary the corresponding end of the floating lever 1, and the high speed trip device 4 holds stationary the other end. In response to an overload or fault, the trip 4 releases the lever 3 so that the floating lever 1 is free to rotate clockwise about the stationary pivot maintained by the linkage 2 under the bias of the spring mechanism S and the breaker reacting force.

After a predetermined downward or opening movement of B, the spring mechanism S again comes into action and through the lever 3 reverses the movement of the floating lever 1 so as to move it counterclockwise to reclose the breaker at high speed. That is, at any desired point in the opening stroke the spring mechanism S can come into action to apply a reversing force for reclosing the breaker.

During this automatic reclosing operation, however, B is trip-free in case of a sustained fault by reason of the collapsible linkage 2 of the motor device M. After a first automatic opening, the breaker trip control is temporarily shifted from the high speed trip 4 to the motor device M. In case of a sustained fault the complete cycle of the mechanism is "open-close-open" (O—C—O). The recharging and resetting device R then automatically restores the mechanism to its operative position in readiness for another cycle and the breaker at B is closed when the fault has been cleared, from the operator's control panel through the motor device M.

Referring more specifically to the mechanism, the motor device at M comprises a well-known type of fly-ball mechanism for effecting reciprocal motion when the fly-balls at 5 are extended in the manner shown. A counterweight at 6 is connected to the fly-ball linkage for stretching the same to the initial or resetting position in response to operation of the releasing device. The mechanism is operatively connected through a toggle linkage 9—10 controlled by a latching device 11 to one end of a bell-crank lever 7 having its other end connected at 8 to the floating lever 1. The toggle is held in the thrust-transmitting position shown by a latch member 12 related to a tripping solenoid 13. When the tripping solenoid 13 is energized to actuate the latch 12 the latter is cammed clockwise to release the roller of the main latch 11 carried by link 10. This in turn releases the toggle 9—10 which buckles under the reacting force of the breaker tending to rotate the bell-crank lever 7 clockwise. Therefore, the tripping operation above described results in dropping of the adjacent end of the floating lever 1 and opening of the breaker. The reverse operation is believed to be obvious, the latch 12 after resetting being effective to hold the toggle in thrust-transmitting position so that extension of the fly-balls causes counterclockwise rotation of the bell-crank lever 7 and movement of breaker rod B to closed circuit position.

The spring device S comprises essentially an opening spring $s_1$ and a reclosing spring $s_2$. The springs are each seated on fixed abutments as illustrated which also serve as guides for the spring plungers 15 and 16 respectively. The spring plungers are each provided with fixed collars 15' and 16' coacting with the opposite ends of the springs so that the same can be compressed by the plungers between the collars and fixed abutments. The springs $s_1$ and $s_2$ are individually and selectively related to the lever 3 so that the springs can be discharged separately for rotating the lever 3 in opposite directions as above described.

To this end the opening spring $s_1$ is connected through the plunger 15 to a lever 17 having an independent fixed pivot at 18. The opposite end of the lever 17 is connected at 19 through a toggle 20—21 to the lever 3. The knee of the toggle at 22 is adapted to be held in thrust-transmitting position by a link 23 coacting with a suitable latching and tripping device. The latching and tripping device in the present instance comprises a pivoted member 24 having a pin 25 operable within the slot 23' of the link 23, and a latching roller 26 for coacting with a spring biased latch 27.

When the roller 26 is latched as illustrated, the toggle 20—21 is held in rigid or thrust-transmitting position so that the reaction of the spring $s_1$, when under compression, tends to rotate the lever 3 counterclockwise in the circuit-opening direction. Accordingly, actuation of the high speed trip 4 to release the opposite end of the lever 3 causes opening of the breaker through the spring $s_1$ in the manner above described.

The reclosing spring $s_2$ is connected through the plunger 16 to a lever 28 pivoted at 28' and to which is pivotally connected at 29' the link 29. The link 29 is also connected to the latching member 24 through the pin 25 so that in the latched position of member 24 the spring $s_2$ is also held under compression, the reclosing spring force tending to rotate the member 24 clockwise through a small lever arm. The connection between the main lever 3 and the link 29 is through the linkage 23—21 previously referred to.

Referring more particularly to the high speed trip 4 that is arranged to release the lever 3 for initiating opening of the breaker by the spring $s_1$, the main latching portion of the trip comprises a crank 30 for engaging a roller 31 carried by the lever 3. The crank member 30 is spring biased as at 32 in a clockwise or resetting direction. The tripping force is produced by a spring 33 acting on the tripping member 30 through a lever 34. When the lever 34 is rotated by the spring 33 in a counterclockwise direction, the member 30 is engaged and also rotated counterclockwise to release the roller 31. A resilient connection between the members 30 and 34 is provided at 35 for resetting the member 30 independently of the lever 34.

The tripping control comprises a high speed magnet comprising in the present instance a permanent magnet portion 36, a coacting armature 37 secured to the lever 34, and a flux-shifting or "bucking" coil 38 which when energized weakens the magnetic field at the armature 37 in a manner well known in the art to permit the compression spring 33 to throw the lever 34 to the tripping position. Resetting of the high speed trip to the position shown is effected by the resetting spring 32 in combination with the magnetic effect of the permanent magnetic portion 36. In this position the tripping spring 33 is under compression in readiness for another tripping impulse.

The automatic opening and reclosing cycle takes place in the following manner: Assuming now that the breaker at B is in its normally closed circuit position with the mechanism in the position shown, actuation of the high speed trip 4 through the coil 38 in response to actuation of the usual overload or fault relay at 40 effects release of the lever 3 so that the opening spring $s_1$ causes rotation of the floating lever 1 about the stationary roller 8. As the breaker member B moves downward, an auxiliary tripping device comes into action for releasing the reclosing spring. This comprises a member 41 connected to the moving end of the floating lever 1 through the walking beam 42 and connecting rods 43 and 44. The tripping member 41 is also suitably related to the latch member 27, as at 45 so that the latch can be actuated to release the roller 26 in response to predetermined lowering of the floating lever 1. The connecting rod 44 is adjustably connected as at 44' to the walking beam 42 so that the latch 27 can be actuated at the desired point in the opening stroke of the breaker.

When this auxiliary tripping operation takes place, the charged reclosing spring $s_2$ instantly acts to reverse the movement of the floating lever in the manner above described to cause reclosure of the breaker. It will be apparent that although the energy of the opening spring $s_1$ has not been completely dissipated at the time the reclosing trip takes place the collapse of the toggle 20—21 due to the tripping operating at 27 is effective both to render operative for reclosure the connecting linkage 23—21 and to prevent interference between the springs $s_1$ and $s_2$. The lost motion connection at 23' permits the lever 28 to act on the lever 3 during reclosure independently of the associated linkage.

Assuming now that the fault no longer exists and the breaker can remain closed, the spring mechanism S is recharged and reset in the following manner. When the floating lever 1 is returned to the closed circuit position, the high speed trip member 30 is biased by the means above described towards resetting position for again latching the roller 31 of the lever 3. At the same time the member 30 closes an auxiliary switch at 46 for completing through a second auxiliary or limit switch 47 an energizing circuit for the motor contactor coil 48. The motor contactor 49 controls energization of a motor 50 that is suitably connected or geared to a shaft indicated at 51. The shaft 51 has mounted thereon a cam 52 for controlling the motor circuit and for applying a brake to the motor at the end of the spring charging operation, and a second cam 53 for effecting charging of the springs s1 and s2.

The spring charging cam 53 is related to the spring plungers 15 and 16 through a pair of co-pivoted levers 55 and 56 respectively. The lever 55 is provided with an abutment 55' adapted to engage the lever 56 in a recess 56'. The arrangement is such that when the cam 53 is rotated to cause counterclockwise rotation of the lever 55 to charge the spring s1, the lever 56 is also picked up and the spring s2 recharged also.

The cam 52 is related to the limit switch 47 through a lever 57 that is also resiliently connected at 58 to the lever 56. The spring 58 is adapted to function either as a compression or tension member and in the position shown is under tension to maintain the limit switch at 47 open. The member 57 is also resiliently connected at 59 to a brake band 60 for stopping the motor 50 when the limit switch at 47 is opened.

When the springs s1 and s2 are discharged, and the spring charging operation is in order, the roller 53' coacting with the operating face of cam 53 is pressed by the remaining bias acting on levers 55 and 56 against the cam, and the spring 58, now being under compression, biases the lever 57 clockwise to close the motor limit switch 47. The motor is now energized through the contactor 49 and the cams 52 and 53 are rotated in the direction indicated. As the cam 53 continues to rotate the levers 55 and 56 counterclockwise to charge the springs s1 and s2, the cam 52 maintains the limit switch 47 closed against the increasing tension of the spring 58. When the springs are charged the desired amount the lever 57 drops to the low point of the cam 52 under the bias of spring 58 so as simultaneously to open the limit switch and apply the motor brake. The spring-charging operation is now completed, and the motor 50 cannot again be energized until the springs s1 and s2 have been discharged.

It will be noted that the mechanism is effectively interlocked to prevent improper operation thereof. The reclosing spring cannot be discharged prior to discharge of the opening spring s1 since the auxiliary trip at 27 is dependent on the prior operation of the high speed opening trip 4. It therefore follows that the reclosing spring lever 56, which is connected to the limit member 57 in the manner above described, cannot function prior to discharge of the opening spring. Accordingly, a spring recharging operation cannot be initiated until both springs have discharged and the high speed trip 4 has reset to close the auxiliary switch 46.

If now it be assumed that the fault has not cleared necessitating reopening of the breaker, the opening release is accomplished in the following manner. In the open-close cycle above described the breaker member B causes momentary closure of an auxiliary or "passing" switch 61 by means of an abutment 62. This momentary closure is sufficient to energize the coil 63 of a time delay or dash-pot device 64 for closing an auxiliary circuit at 65. The dash-pot or relay normally closes a circuit at 66 including the tripping coil 38 of the trip 4. By reason of the dash-pot 64 the circuit is maintained at 65 for a few seconds which is sufficient to transfer the breaker tripping control from the high speed trip 4 to the trip coil 13 of mechanism M. This selective control is in accordance with the operation of the breaker at B.

Accordingly, when the breaker is reclosed the overload relay at 40 can energize the trip coil 13 through an auxiliary switch 67 and the time delay switch at 65. Therefore the mechanism is trip free during reclosing by reason of the transfer of trip control above described. As previously described, the linkage 2 when unlatched permits the left end of the floating lever to drop so that the breaker can open. The temporary transfer of the tripping control need be no longer than required for the recharging mechanism R to function in restoring the spring mechanism to its original position. Accordingly, the mechanism is trip free during the recharging operation and the recharging operation can continue without interruption even though the breaker has again tripped open. At the end of this OCO cycle, the breaker can be closed at will through the mechanism M and, when the recharging operation is completed, the mechanism is in readiness for another OCO cycle. It will be apparent that the breaker can be controlled as to normal opening and closing operations by the mechanism M from the operator's control panel during the charged condition of mechanism S.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States, is:

1. A high speed reclosing mechanism for an electric circuit breaker comprising means for opening said breaker, energy storing means for directly applying instantly a reclosing force to said breaker, and means for releasing the energy stored in the aforesaid means at a predetermined intermediate point in the opening stroke of said breaker for obtaining reclosure thereof.

2. A high speed reclosing mechanism for an electric circuit breaker comprising means for opening said breaker, a collapsible connection between said means and said breaker, energy storing means for applying instantly a reclosing force to said breaker, and tripping means for rendering inoperative said collapsible connection and for releasing the energy stored in the aforesaid means at a predetermined intermediate point in the opening stroke of said breaker for obtaining immediate reclosure thereof.

3. A high speed reclosing mechanism for an electric circuit breaker comprising means for opening said breaker, spring means for applying instantly a reclosing force to said breaker, an opening trip for initiating the circuit opening movement of said breaker and tripping means actuated by and in accordance with opening movement of said breaker at a predetermined intermediate point in the opening stroke for rendering inoperative said opening means and for releasing said spring for effecting immediate reclosure of the breaker.

4. A high speed reclosing mechanism for an electric circuit breaker comprising a breaker operating member, a floating lever intermediate the ends of which said member is connected, a motive device operatively connected through a collapsible thrust-transmitting linkage to one end of said floating lever, a spring mechanism operatively connected to the opposite end of said lever, said spring mechanism being adapted to apply both opening and reclosing forces to said breaker through said floating lever, an opening trip associated with said spring mechanism for releasing part of the spring energy for rotating said floating lever with respect to said motive device in the opening direction, and an auxiliary trip related to said breaker for releasing the reclosing force of said spring mechanism at a predetermined intermediate point in the opening stroke for effecting reverse rotation of said floating lever and immediate breaker reclosure.

5. A high speed reclosing mechanism for an electric circuit breaker comprising a spring mechanism including an opening spring and a reclosing spring, a trip device for releasing said opening spring for initiating opening movement of the breaker, a collapsible connection between said opening spring and breaker, an auxiliary trip operable in response to predetermined opening of said breaker for simultaneously rendering said collapsible connection inoperative and releasing said reclosing spring for immediately reclosing said breaker.

6. A high speed reclosing mechanism for an electric circuit breaker comprising a spring device, means including a collapsible connection operatively interconnecting said breaker and spring device, means for effecting an energy storing operation on said spring device, an opening trip for releasing part of the energy in said device for initiating opening of said breaker through said collapsible connection and an auxiliary trip actuated by and in accordance with predetermined opening movement of said breaker for simultaneously rendering inoperative said connection and for releasing additional energy in said device for effecting immediate reclosure of said breaker.

7. A high speed reclosing mechanism for an electric circuit breaker comprising a motive device operatively connected to said breaker through a collapsible thrust transmitting linkage, a spring device likewise operatively connected to said breaker, means for storing energy in said spring device, means including a collapsible connection interconnecting said spring device and breaker, a high speed opening trip for releasing a part of the energy in said spring device for initiating through said collapsible connection the opening movement of said breaker, an auxiliary trip for simultaneously rendering inoperative said collapsible connection and releasing additional energy in said spring device for effecting immediate reclosure of said breaker, and means for rendering trip free said breaker during said reclosing operation including a tripping device associated with said collapsible thrust transmitting linkage.

8. A high speed reclosing mechanism for an electric circuit breaker comprising a spring device including opening and reclosing springs, means including a collapsible connection interconnecting said spring device and breaker, a trip for releasing the opening spring for transmitting through said collapsible connection an opening force to said breaker, a trip for holding said connection in thrust transmitting position and for restraining said reclosing spring, means for precluding operation of said last-named trip until after operation of said opening trip and predetermined opening movement of said breaker, and means interconnecting said reclosing spring and breaker for effecting immediate reclosure thereof when said trip is actuated.

9. A high speed reclosing mechanism for an electric circuit breaker comprising a spring device including opening and reclosing springs, means for charging said springs including a cam, a lever connected to said opening spring and operatively related to said cam, a second lever connected to said reclosing spring and adapted to be in abutting relation to said first lever whereby both the opening and closing springs can be charged substantially simultaneously, the relation of said levers being such that said reclosing spring cannot be discharged prior to discharge of said opening spring, and tripping means operatively related to said springs for effecting in predetermined sequence automatic opening and immediate reclosure of said breaker.

10. A high speed reclosing mechanism for an electric circuit breaker comprising actuating means, a collapsible thrust transmitting structure interconnecting said means and breaker, a trip associated therewith, a separate opening and reclosing device also associated with said breaker, a second trip for initiating breaker opening movement associated with said opening device, and means for temporarily transferring the tripping control of said breaker from said second trip to said first trip upon opening of said breaker.

11. A high speed reclosing mechanism for an electric circuit breaker comprising an actuating device, a collapsible thrust transmitting structure operatively interrelating said device and breaker, a trip associated with said structure for permitting opening of said breaker, a separate opening and reclosing mechanism also related to said breaker, a high speed opening trip associated with said mechanism for initiating opening movement of said breaker independently of said first-named trip, means controlling said mechanism for reversing the movement of said breaker and initiating the reclosing operation at an intermediate point in the opening stroke, and a time delay device actuated in response to opening of said breaker for transferring temporarily the breaker trip control from said high speed trip to said first-named trip.

12. A high speed reclosing mechanism for an electric circuit breaker comprising an opening spring and a reclosing spring, means for controlling the release of energy stored in said springs for opening and reclosing said breaker in said sequence, means for charging said springs including a cam and a pair of levers separately connected to said opening and closing springs respectively, said levers being so related that discharge of said reclosing spring prior to discharge of said opening spring is precluded, a motor for driving said cam, a member responsive to the angular position of said cam for controlling the circuit of said motor, and a resilient connection between said member and the lever associated with said reclosing spring arranged so that said member is biased toward circuit energizing position when said reclosing spring is discharged and is biased toward circuit opening position when said reclosing spring is charged.

13. A circuit breaker operating mechanism including a trip device for causing opening of the breaker, auxiliary means for biasing the breaker toward open circuit position, a second trip device for controlling said auxiliary means, and means for transferring the trip control from said second trip device to said first trip device after actuation of said second trip device.

14. A circuit breaker operating mechanism of the reclosing type including tripping means for causing trip free opening of the circuit breaker, a second tripping means also responsive to tripping impulses for causing opening of said breaker in the reclosing cycle, and a relay for temporarily transferring the trip control from said second tripping means to said first tripping means after actuation of said second tripping means.

15. A high speed reclosing mechanism for an electric circuit breaker comprising means for opening said breaker, energy storing means for applying a reclosing force to said breaker, and means for instantly releasing the energy stored in the aforesaid means at a predetermined intermediate point in the opening stroke of said breaker for obtaining high speed reclosure thereof.

16. A high speed reclosing mechanism for an electric circuit breaker comprising means for opening said breaker, a spring for directly applying a reclosing force to said breaker, and means for instantly releasing spring energy at a predetermined intermediate point in the opening stroke of said breaker for obtaining high speed reclosure thereof.

17. An automatic circuit breaker reclosing mechanism comprising circuit breaker opening means, a high speed trip device responsive to a circuit fault condition for causing opening of said breaker, means responsive to the breaker opening movement for subsequently causing high speed reclosure of said breaker, tripping means related to said reclosing means, and means for transferring the trip control from said high speed trip device to said reclosing tripping means immediately upon initial opening of said breaker so that the mechanism is trip-free during the reclosing stroke.

18. A high speed automatic circuit breaker reclosing mechanism comprising tripping means responsive to a circuit fault condition for causing opening of said breaker, means responsive to said opening operation for causing high speed reclosure of said breaker, tripping means related to said reclosing means, and means for effecting transfer of the tripping control from said opening tripping means to said reclosing tripping means for obtaining trip-free operation during reclosure, said transfer means being actuated in accordance with the circuit opening movement of said breaker.

19. A circuit breaker operating mechanism comprising means for closing said circuit breaker, a tripping latch operative to cause opening of said circuit breaker under one predetermined condition, a second tripping latch operative to cause opening of said circuit breaker under another condition, electromagnetic means for actuating said tripping latches and a relay for selectively controlling said tripping latches.

20. A circuit breaker operating mechanism comprising means for closing said circuit breaker, a tripping latch operative to cause opening of said circuit breaker in response to normal tripping impulses initiated by fault and manual control, a second tripping latch operative to cause trip-free opening of said circuit breaker during the reclosing thereof, electromagnetic fault responsive means for actuating said tripping latches and a relay for selectively controlling said tripping latches.

21. A circuit breaker operating mechanism comprising means for closing said circuit breaker, a tripping latch operative to cause opening of said circuit breaker from a fully closed position in response to a normal tripping impulse, a second tripping latch operative to cause trip-free operation of said circuit breaker during the reclosing thereof, a single fault responsive means for controlling actuation of said latches, and selective means cooperating therewith for controlling the operation of said latches.

22. A circuit breaker operating mechanism comprising means for closing said circuit breaker, a tripping latch operative to cause opening of said circuit breaker under one predetermined condition, a second tripping latch operative to cause opening of said circuit breaker under another condition, electromagnetic fault responsive means for actuating said tripping latches and a transfer relay for controlling both said tripping latches in accordance with the circuit controlling position of said circuit breaker.

23. A circuit breaker operating mechanism comprising circuit breaker opening and closing means, a tripping latch operative to cause opening of said breaker when it is in its normal fully closed position, a second tripping latch operative to cause trip-free opening of said circuit breaker during closing thereof, electromagnetic means for actuating said tripping latches, auxiliary contacts responsive to the operation of said circuit breaker, and a relay controlled by said contacts for selectively controlling said latches.

24. An automatic circuit breaker reclosing mechanism comprising means for opening and closing said circuit breaker, a tripping device responsive to a normal tripping impulse for causing opening of said breaker, means actuated by and in accordance with said opening operation for subsequently causing high speed reclosure of said breaker, a second tripping device related to said reclosing means, and means for selecting solely for the tripping control said second tripping device during the reclosing of said circuit breaker, said first tripping device being selected for tripping control under other conditions.

25. A circuit breaker operating mechanism comprising means for closing said circuit breaker, a tripping latch operative to cause opening of said circuit breaker under one predetermined condition, a second tripping latch operative to cause opening of said circuit breaker under another condition, electromagnetic fault responsive means for tripping said latches and a transfer relay for controlling the tripping of both said latches in accordance with the electrical condition of the circuit.

26. The combination with a circuit breaker having an operating member movable to open and to closed circuit positions, of control apparatus for the breaker comprising a closing spring, means for flexing said spring to store energy therein, means for releasably holding said spring in flexed position, means operable to establish a driving connection between said spring and said operating member and for releasing said spring to cause the spring to move said operating member to closed circuit position, said last-mentioned means being operable at a predetermined point in the opening movement of the operating member before it reaches full open position to halt opening movement of said member and return the same to closed circuit position.

27. In combination, a circuit breaker having an operating member biased to open circuit position and movable to closed circuit position, control apparatus for the breaker comprising a closing spring, means for flexing said spring to store energy therein and for releasably holding said spring in flexed position, means operable to release said spring and establish a driving connection between the spring and said operating member to cause the spring to move said operating member to closed circuit position, said last-mentioned means being operable at a predetermined point in the opening movement of said member before it reaches full open position to halt opening movement of the member and return the same to closed circuit position.

28. In combination, a circuit breaker having an operating member biased to open circuit position and movable to closed circuit position, control apparatus for the breaker comprising a closing spring, means for flexing said spring to store energy therein and for releasably holding said spring in flexed position, means operable to release said spring and establish a driving connection between the spring and said operating member to cause the spring to move said operating member to closed circuit position, said last-mentioned means being operable at a predetermined point in the opening movement of said member before it reaches full open position to halt opening movement of the member and return the same to closed circuit position, and means for disestablishing said driving connection in response to predetermined conditions to allow said operating member to be moved to open circuit position.

29. In combination, a circuit breaker having an operating member movable to open and to closed circuit positions, trip means operable to cause movement of said operating member to open circuit position, and reclosing means operable to halt opening movement of the operating member before it reaches full open position and return it to closed circuit position, said last-mentioned means comprising a closing spring and means for releasing said spring and effecting a driving connection between said spring and said member to cause said spring to move said operating member to closed circuit position.

30. In combination, a circuit breaker having an operating member movable to open and to closed circuit positions, means operable to effect movement of said member to open circuit position, reclosing means operable to halt opening movement of the operating member before it reaches full open circuit position and to return the same to closed circuit position, said reclosing means comprising an energy storing device, means for storing energy in said device and releasably holding energy stored therein, and means for transmitting the energy when released to said operating member to effect reclosing of said member.

CARL THUMIM.